United States Patent
Allen et al.

(10) Patent No.: US 7,167,604 B2
(45) Date of Patent: Jan. 23, 2007

(54) PORTABLE DOCUMENT SCAN ACCESSORY FOR USE WITH A WIRELESS HANDHELD COMMUNICATIONS DEVICE

(75) Inventors: Ross R. Allen, Belmont, CA (US); Philip E. Jensen, Bellvue, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 753 days.

(21) Appl. No.: 10/214,267

(22) Filed: Aug. 7, 2002

(65) Prior Publication Data

US 2004/0028295 A1 Feb. 12, 2004

(51) Int. Cl.
G06K 1/20 (2006.01)
G06K 1/22 (2006.01)
H04N 1/04 (2006.01)
H04H 1/32 (2006.01)

(52) U.S. Cl. ............ 382/313; 382/312; 358/442; 358/474

(58) Field of Classification Search ........ 382/313–314, 382/321; 358/473, 474, 442
See application file for complete search history.

(56) References Cited

U.S. PATENT DOCUMENTS

| 5,578,813 A | 11/1996 | Allen et al. |
| 5,606,594 A | 2/1997 | Register et al. |
| 5,644,139 A | 7/1997 | Allen et al. |
| 5,825,044 A | 10/1998 | Allen et al. |
| 5,971,279 A | 10/1999 | Raistrick et al. |
| 6,027,828 A | 2/2000 | Hahn |
| 6,119,179 A | 9/2000 | Whitridge et al. |
| 6,195,475 B1 | 2/2001 | Beausoleil, Jr. et al. |
| 6,303,921 B1 | 10/2001 | Rohn et al. |
| 6,707,581 B1* | 3/2004 | Browning ............ 358/473 |
| 2002/0066787 A1 | 6/2002 | Duthil et al. |
| 2002/0131636 A1* | 9/2002 | Hou ..................... 382/181 |
| 2003/0095689 A1* | 5/2003 | Vollkommer et al. ...... 382/117 |

FOREIGN PATENT DOCUMENTS

| WO | WO0038100 | 6/2000 |
| WO | WO0142974 | 6/2001 |
| WO | WO0179956 | 10/2001 |

* cited by examiner

Primary Examiner—Duy M. Dang

(57) ABSTRACT

A scanning system includes a scanner accessory which is operationally supported by a wider-purpose wireless handheld communications device. The communications device may be a personal digital assistant (PDA), a cellular phone, a combined PDA/cellular phone, or a similar device that enables wireless communications. The scanner accessory is adapted for freehand scanning and includes an image sensor, at least one navigator, and data transfer circuitry that is compatible with exchanging information with the communications device, including outgoing captured image information and incoming scan control information for controlling scanning operations by the scan accessory. Simultaneous with capturing image information by the image sensor, the navigator tracks the position of the image sensor relative to a document being scanned, so that the image information can be "position-tagged" to form an electronic image for display at the communications device. Alternatively, the scanning capability can be integrated into the wireless handheld communications device.

10 Claims, 10 Drawing Sheets

PORTABLE DOCUMENT SCAN ACCESSORY FOR USE WITH A WIRELESS HANDHELD COMMUNICATIONS DEVICE

TECHNICAL FIELD

The invention relates generally to scanning techniques and more particularly to scanning devices and methods that accommodate economic portable document scanning.

BACKGROUND ART

Known devices for forming an electronic image of an original by scanning the original may be generalized into four classifications, namely drum scanners, flatbed scanners, two-dimensional array scanners, and hand scanners. Drum scanners attach the original to the surface of a cylindrical drum that rotates at a substantially fixed velocity relative to an image sensor that is moved in a direction parallel to the rotational axis of the drum. Flatbed scanners typically utilize a linear sensor array that is moved relative to the original along an axis that is perpendicular to the axis of the sensor array. Similar to flatbed scanners, hand scanners include a one-dimensional array of sensors and are moved relative to the original. On the other hand a two-dimensional sensor array may be held motionless during an exposure period, if the array is sufficiently large to image the entire original during the exposure period.

Each general class of scanners offers advantages relative to the other scanners. For example, a hand scanner is easily transported. A concern with the early models of hand scanners was that the sensor array of the scanner needed to be moved in a precise path along the original in order to ensure that the electronic image did not include an unacceptable level of distortion. Thus, mechanical elements, such as cylindrical rollers or wheels, were incorporated into the hand scanners to enforce a single translational degree of freedom during the scanning process.

U.S. Pat. No. 5,578,813 to Allen et al., which is assigned to the assignee of the present invention, describes a freehand image scan device which compensates for non-linear movement of the sensor array. The scan device includes an imaging sensor and at least one navigation sensor. For example, the imaging sensor may be a one-dimensional array of sensor elements and there may be a separate two-dimensional navigation sensor array at each end of the imaging sensor. Each navigation sensor array acquires position information while the imaging sensor is capturing image information that is then "stitched" together on the basis of the position information. The navigation sensors may track movement of the imaging sensor along the original by monitoring variations of inherent structure-related properties of the original. Such inherent structure-related properties include features such as paper fibers of a paper original and specular patterns of a glossy original. Features of freehand image scan devices are also described in U.S. Pat. No. 5,644,139 to Allen et al., U.S. Pat. No. 5,825,044 to Allen et al., U.S. Pat. No. 6,005,681 to Pollard, U.S. Pat. No. 6,195,475 to Beausoleil, Jr. et al., U.S. Pat. No. 6,249,360 to Pollard et al., and U.S. Pat. No. 6,259,826 to Pollard et al., all of which are assigned to the assignee of the present invention.

A freehand image scan device of the type described in any one of the Allen et al. patents is a self-contained unit that includes an image display screen, control mechanisms (such as pushbutton controls), a power supply, memory, and image processing. The processing of captured image data and position information is computationally intensive. Image acquisition and processing is typically performed by on-board application specific integrated circuits (ASICs). The scan device may also include communication software and hardware, such as a cable connection and associated drive software or such as infrared capability.

While the currently available freehand image scan devices, as described in the Allen et al. patents, significantly extend the occasions in which document scanning is practical, further advancements are desired. What is needed is a scan capability that can be achieved in a more economical manner and that extends the capabilities of devices which are currently carried by mobile professionals.

SUMMARY OF THE INVENTION

A scanner accessory is designed for use with a wider-purpose handheld communications device that provides resources and functionalities for the scanning operations, so that the scanner accessory is not required to include the same resources or enable the same functionalities. Thus, the capabilities of the wireless handheld communications device are extended to the area of document scanning, but a host/peripheral relationship between the communications device and the scanner accessory provides advantages with respect to the cost, size and performance of this mobile scanning solution.

A "wireless handheld communications device" is defined herein as a device that is designed to be conveniently operated within the hand of a user and that enables wireless communications, wherein the wireless communication involving the device may be with either or both of the scanner accessory or a network. Wireless handheld communications devices include personal digital assistants (PDAs), cellular telephones, and other devices that provide external communication using a protocol such as the Bluetooth 802.11 protocol.

The scanner accessory is a peripheral device that leverages resources from the wireless handheld communications device. This results in a less expensive and smaller scan device than the one described in the above-referenced patents to Allen et al. For example, a handheld communications device, such as a PDA or cellular telephone, may provide user interface, image display, and document management functions. Thus, the scanner accessory may include only an image sensor for capturing image information, a navigator capability for generating navigation information that is representative of the positions of the image sensor during a scanning operation, the illumination sources that may be necessary for the image sensor and the navigator capability, and data transfer circuitry that is compatible with exchanging information with the wireless handheld communications device. The data transfer circuitry may accommodate a cable connection to the wireless handheld communications device, infrared (IR) or 802.11 protocol communications with the communications device, connector-to-connector compatibility, or other connectivity known to persons skilled in the art. An example of a connector-to-connector compatibility is one in which the scanner accessory is formed as a cradle that receives the wireless handheld communications device. Alternatively, the scanner accessory may plug into and be supported by an electrically and mechanically compatible interface on the wireless handheld communications device.

In one implementation of the scanner accessory, a scan device is formed to include a contact image sensor, the illumination source for the image sensor, two navigators, illumination sources for the navigators, computation circuitry, storage, and an auxiliary power supply. The computation circuitry may be an application specific integrated circuit (ASIC) that enables correlations of image information with navigation information directly related to paper surface texture. In other embodiments, a digital signal processor or the like is used to perform this function. The correlations are used to reconstruct the path of the contact image sensor as the sensor is moved across the surface of a document being scanned.

The wireless handheld communications device is used to generate scan control commands and data that are specific to controlling the scanning operations of the scanner accessory. Control "pushbuttons" may be presented to a user as softkeys of a graphical user interface (GUI). Thus, a PDA may be programmed to provide a GUI on a touchscreen, with specialized softkeys that are selectable by the user. As the image information regarding a document is captured by the contact image sensor and is correlated on the basis of the navigation information, an image is formed. The image may be formed at the scanner accessory and may be formed in a common interchange format, such as TIFF, PDF or the like. Where the scanner accessory includes sufficient computational capability to form the image file, but does not include a display capability, the image may be transferred as a file to the wireless handheld communications device for viewing by the user.

As an alternative aspect of the invention, the image scanning capability may be integrated into the wireless handheld communications device. An image sensor and at least one navigator may be mounted onto the surface of a portable housing of a PDA or a cellular telephone. Driver software may be loaded in order to enable the processing circuitry of the PDA or cellular telephone to correlate the image information with the navigation information so as to form a reconstructed image from the image information that is captured as the device is moved relative to a document of interest. A wireless transceiver of the PDA or cellular telephone is used to support wireless transmissions of the reconstructed image to remote devices.

An advantage of the invention is that it extends the functionality of a handheld communications device, such as a PDA or cellular telephone, so that the communications device is able to acquire, manipulate and communicate documents. Document entry by manipulating a PDA or cellular telephone keypad is often tedious. Using the invention, documents may be entered by scanning the documents and using optical character recognition (OCR) to convert the image into a file that can be easily manipulated. Particularly when the scanner accessory is designed so as to mechanically and electrically dock with the wireless handheld communications device, the scanning capability is achieved without requiring a user to carry another appliance.

DETAILED DESCRIPTION

Figure 1:
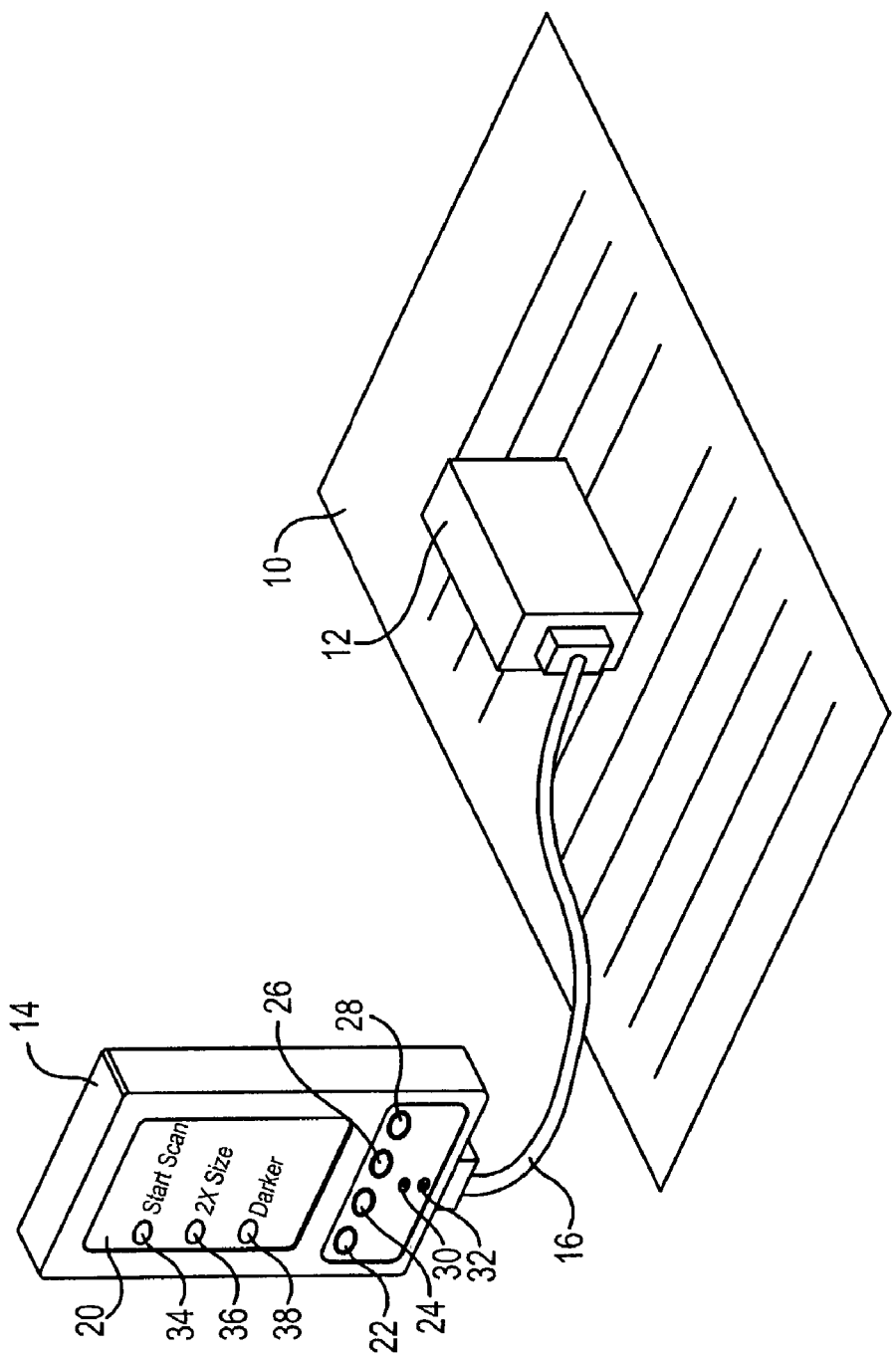
FIG. 1 is a perspective view of a scanning system that includes a wireless handheld communications device and a scanner accessory linked by a cable.
Figure 2:
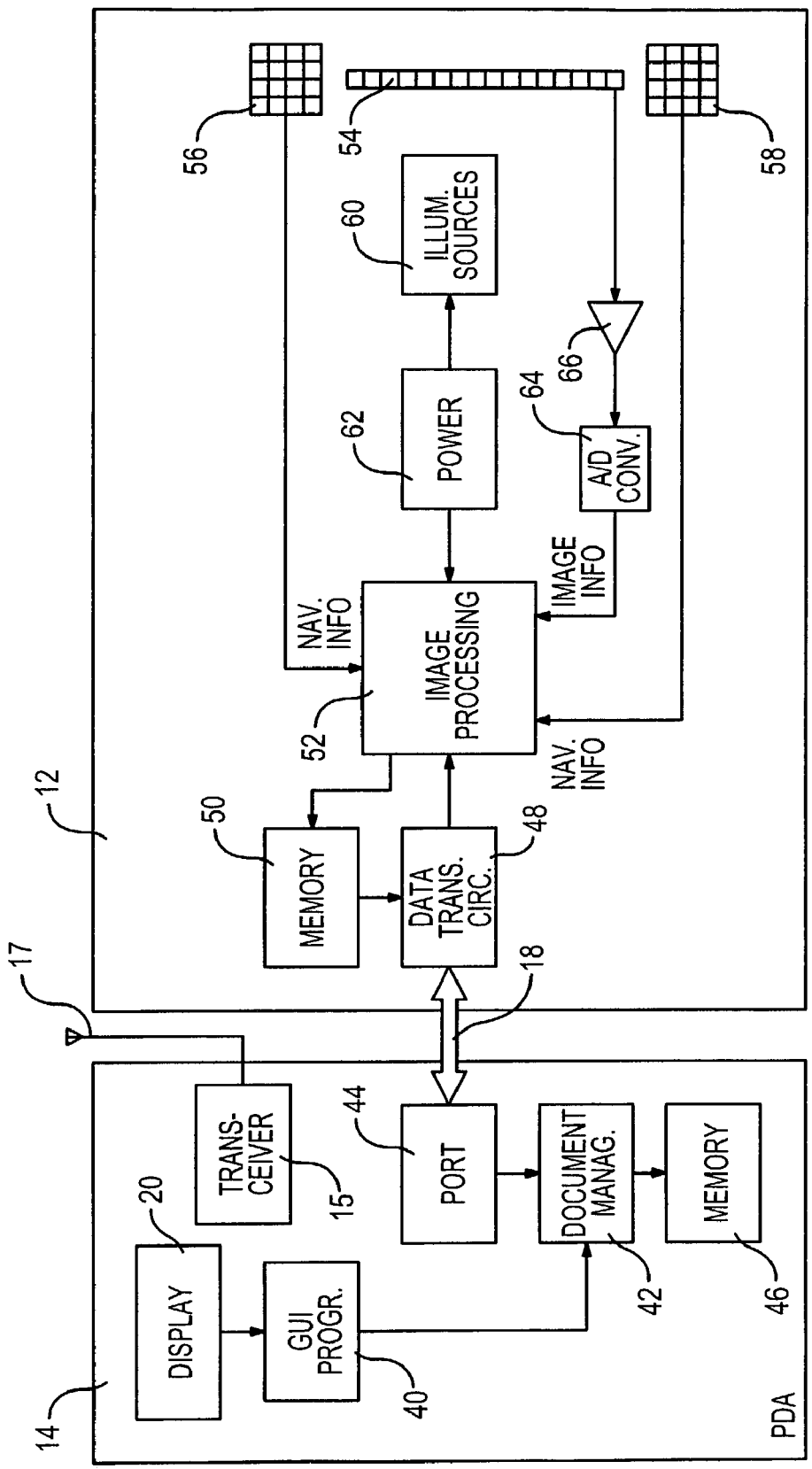
FIG. 2 is a block diagram of components that are relevant to scanning operations by the scanning system of FIG. 1.

With reference to FIGS. 1 and 2, a scanning system for acquiring an electronic image of the surface of a document 10 is shown as including a scan device 12 that functions as an accessory to a wireless handheld communications device 14, which is illustrated in this embodiment as being a personal digital assistant (PDA). While two devices 12 and 14 may be linked via a direct, low bulk electromechanical coupling, the devices are shown in FIG. 1 as being connected by a cable 16 that is detachably linked to connectors of the two devices. The communications device is "wireless," since it is capable of wirelessly transmitting information to an external device, such as a desktop computer via a telecommunications network. The PDA includes a transceiver 15 and an antenna 17 for sending and receiving network communications. As will be described more fully below, the communications device 14 alternatively may be a cellular telephone or other wireless device, such as one that utilizes the Bluetooth 802.11 protocol (e.g., a digital camera capable of wireless transmissions). As an alternative, the communications device 14 may be "wireless" in the sense that it provides wireless communication with the scan device 12, as represented by the device-to-device connection 18 in FIG. 2. Thus, a cable is not required in the embodiment of FIG. 2.

The wireless handheld communications device 14 is a commercially available wider-purpose device. Merely as an example, the communications device may be an HP Jornada or IPAQ PDA. In the embodiment of FIGS. 1 and 2, the scan device 12 does not include an image display. Instead, the display screen 20 of the communications device 14 is used to view the electronic image that is acquired by scanning the document 12. In addition to the standard switches 22, 24, 26, 28, 30 and 32 of the communications device, the communications device includes three softkeys (i.e., software presented keys) 34, 36 and 38 that are presented on the display 20 when the communications device is in a scan mode. The user is able to select the keys to control parameters of scan operations.

The softkeys 34, 36 and 38 presented on the display 20 are generated by graphical user interface (GUI) programming 40 within the communications device 14. The communications device is also programmed to execute document management functions 42. Outgoing management commands and other information are transmitted from a port 44 to the scan device 12 via the cable 16 of FIG. 1 or the wireless connection 18 of FIG. 2. Similarly, incoming information, such as image information, is received via the port 44. Memory 46 may be used to store image files in a conventional interchange format, such as TIFF, PDF or the like.

Data transfer circuitry 48 within the scan device 12 provides connectivity with the communications device 14. The circuitry may provide an electromechanical interface, such as a connector to the cable 16. Alternatively, the data transfer circuitry may be wireless in nature, such as an IR or 802.11 protocol module. The data transfer circuitry is connected to scan device memory 50 and to an image processing capability, which may be an ASIC 52, a digital signal process (DSP), or a general purpose processor. The image processing capability correlates navigation information with image information, as will be described more fully below.

The scan device 12 includes an image sensor 54 and a pair of navigation sensors 56 and 58. In FIG. 1, the sensors are on the side of the scan device 12 that faces the document 10. The image sensor is shown in FIG. 2 as a linear array of discrete optically sensitive elements, but the use of two-dimensional image sensors is also a possibility. The spacing of the elements plays a role in determining the spatial resolution of the image that is acquired. For example, a linear array having a length of 101.6 mm requires 1200 sensor elements to achieve a resolution of 300 dpi (dots per inch). The image sensor may be a charged coupled device, an amorphous silicon photodiode array, or other type of sensor array known in the art. Where physical compactness is an issue, the image sensor is preferably a contact image sensor. However, in applications in which compactness is less of a concern, sensors that include conventional (projective) optics may be employed. The image sensor may be part of a unit that includes an illumination source, illumination optics, and image transfer optics. FIG. 2 shows illumination sources 60 for the three sensors 54, 56 and 58. An auxiliary power supply 62 is also shown for operating the scan device 12. In applications in which the power requirements of the scan device are sufficiently low and the two devices 12 and 14 are connected by a cable or direct connection (as in the plug-in embodiment of FIGS. 4 and 5), the auxiliary power supply 62 may not be needed.

The navigation sensors 56 and 58 are in known positions relative to the image sensor 54. The image sensor forms a signal that is representative of the image of interest, such as print on the document 10. Simultaneously, each navigation sensor forms a signal representative of inherent structure-related properties of the original. "Inherent structure-related properties" are defined herein as properties of the original that are attributable to factors that are independent of forming image data and/or systematic registration data on the original. For most paper products, paper fibers may be imaged by the navigation sensors. Navigation information is formed by generating position signals that are responsive to detection of inherent structure-related properties.

Each navigation sensor 56 and 58 may be accompanied by at least one illumination source 60 that projects light onto the surface having the image to be captured. Emitted light may be in the visible range, but this is not essential.

While the invention is described as using the three sensors 54, 56 and 58, other arrangements are possible without diverting from the invention. For example, navigation information may be generated using known techniques such as encoding wheels and balls, computer mice trackballs, accelerometers, mechanical linkages, and electrostatic linkages.

Image information generated at the image sensor 54 may be "position-tagged" on the basis of the navigation information from the navigation sensors 56 and 58. As one possibility, the position-tagging may be accomplished using the particular ASIC which was developed for the Hewlett-Packard handheld scanner referred to as the CapShare 920. However, other processing approaches may be substituted.

In the position-tagging, pixel values are generated on the basis of the navigation information from the navigation sensors 56 and 58. Based upon the computed correlations, coordinates are determined for the current position of each navigation sensor. The image processing ASIC 52 also receives pixel values from the image sensor 54. Although FIG. 2 shows only a single tap from the image sensor and a single analog-to-digital converter 64 connected to an amplifier 66, there may be multiple taps with dedicated converters and amplifiers. The current position coordinates of the navigation sensors are used to "tag" the ends of a line of image data that corresponds to a number of pixels within the image sensor 54. Correlation processing is described in greater detail in U.S. Pat. No. 6,195,475 to Beausoleil, Jr. et al., which is assigned to the assignee of the present invention. While other correlation processes may be substituted, the approach will be described conceptually with reference to FIG. 3.

Figure 3:
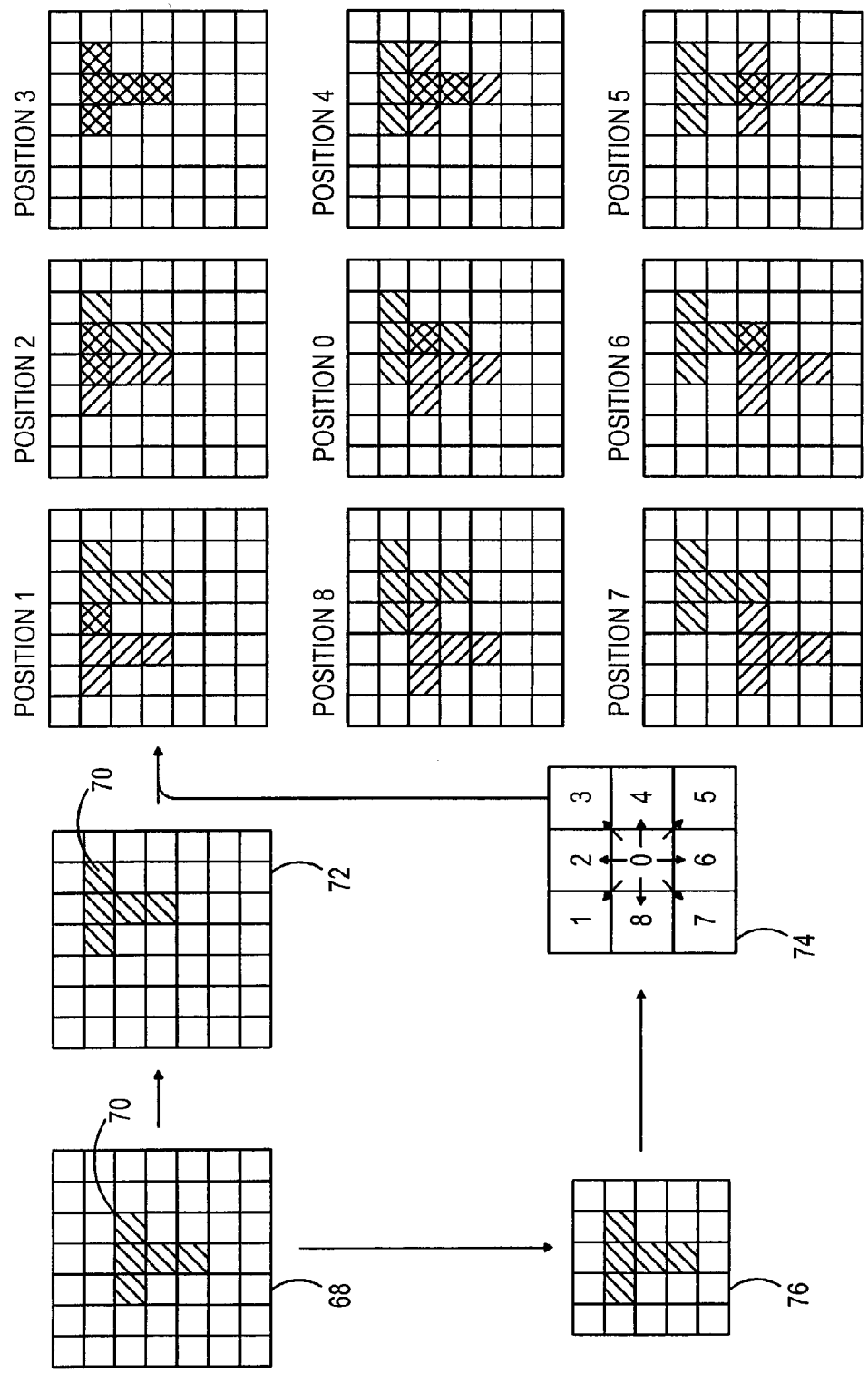
FIG. 3 is a schematic view of correlation processing in accordance with one approach to enabling freehand movement of the scanner accessory of FIG. 1.

In FIG. 3, a reference frame 68 is shown as having a structural feature 70 that has a T-shape. The reference frame is a single frame of information from one of the navigation sensors 56 and 58 of FIG. 2. The size of the reference frame depends upon factors such as the maximum relative movement between the scan device 12 and the document being scanned, the spatial frequencies in the imaging of the structural or printed features of the document, and the image resolution of the navigation sensor. A practical size of the reference frame 68 for a moving navigation sensor that is 32 pixels by 64 pixels is 24×56 pixels.

At a subsequent time (dt), the navigation sensor acquires a sample frame 72 which is displaced with respect to the reference frame 68, but which includes the same T-shaped structural feature 70. The duration dt should be selected such that the relative displacement of the T-shaped feature 70 is equal to or less than one pixel of the navigation array at the velocity of relative movement. An acceptable time period is 50 microseconds for velocities as high as 0.45 meters/seconds at resolutions of 12 line-pairs per millimeter.

If the navigation sensor has moved during the time period dt between the capture of the reference frame 68 and the capture of the sample frame 72, the first and second images of the T-shaped feature 70 will be ones in which the feature has shifted. While the sample time should allow less than a full-pixel movement, the schematic representation of FIG. 3 shows the feature 70 as being shifted upwardly and to the right by one pixel. The full-pixel shift is shown only to simplify the representation.

The displacement representation element 74 of FIG. 3 represents a sequential shifting of the pixels values of a subframe 76 from the reference frame 68. The sequential shifting represented by element 74 provides an array 78 in which the pixel values of the subframe 76 are shown in eight different nearest-neighbor pixel positions. A ninth position is represented by no shift. That is, "Position 0" does not include a shift, "Position 1" is a diagonal shift upwardly and to the left, "Position 2" is an upward shift, etc. In this manner, the nine pixel-shifted templates can be sequentially combined with the sample frame 72 to produce the array 68 of template-to-sample comparisons. The position frame designated as "Position 0" does not include a shift, so that the result is merely a combination of sample frame 72 and subframe 76. "Position 3" has the minimum number of shaded pixels, and therefore is the frame with the highest correlation. Stated differently, "Position 3" is the template-to-sample comparison with the greatest overlap of the two representations of the T-shaped feature 70. Based upon the correlation results, the position of the T-shaped feature in the sample frame 72 is determined to be a diagonal rightward and upward shift relative to the position of the same feature in the earlier-acquired reference frame 68. It follows, that the scan device moved leftwardly and downwardly during the time dt.

Using the correlation approach described with reference to FIG. 3, it is necessary to periodically replace the reference frame 68. Optionally, the reference frame can be replaced by the next-acquired sample frame 72 following each sample time dt. Alternatively, the system may monitor each occurrence of an image feature, such as the T-shaped feature 70, moving more than one pixel length, with the reference frame being replaced upon each such occurrence.

Based upon the correlation processing, image information from the image sensor can be position-tagged to include X and Y coordinates. As a result, a position-tagged data stream is generated. The next operation is to map the position-tagged increments of the data stream. This may be accomplished using techniques known in the art. One approach for determining the physical locations of each pixel of image information is a modification of the Bresenhamn Raster Line Technique. The modification to the technique is that, because the array of pixels and the image sensor is fixed, the line loop will be fixed at the same number.

Figure 4:
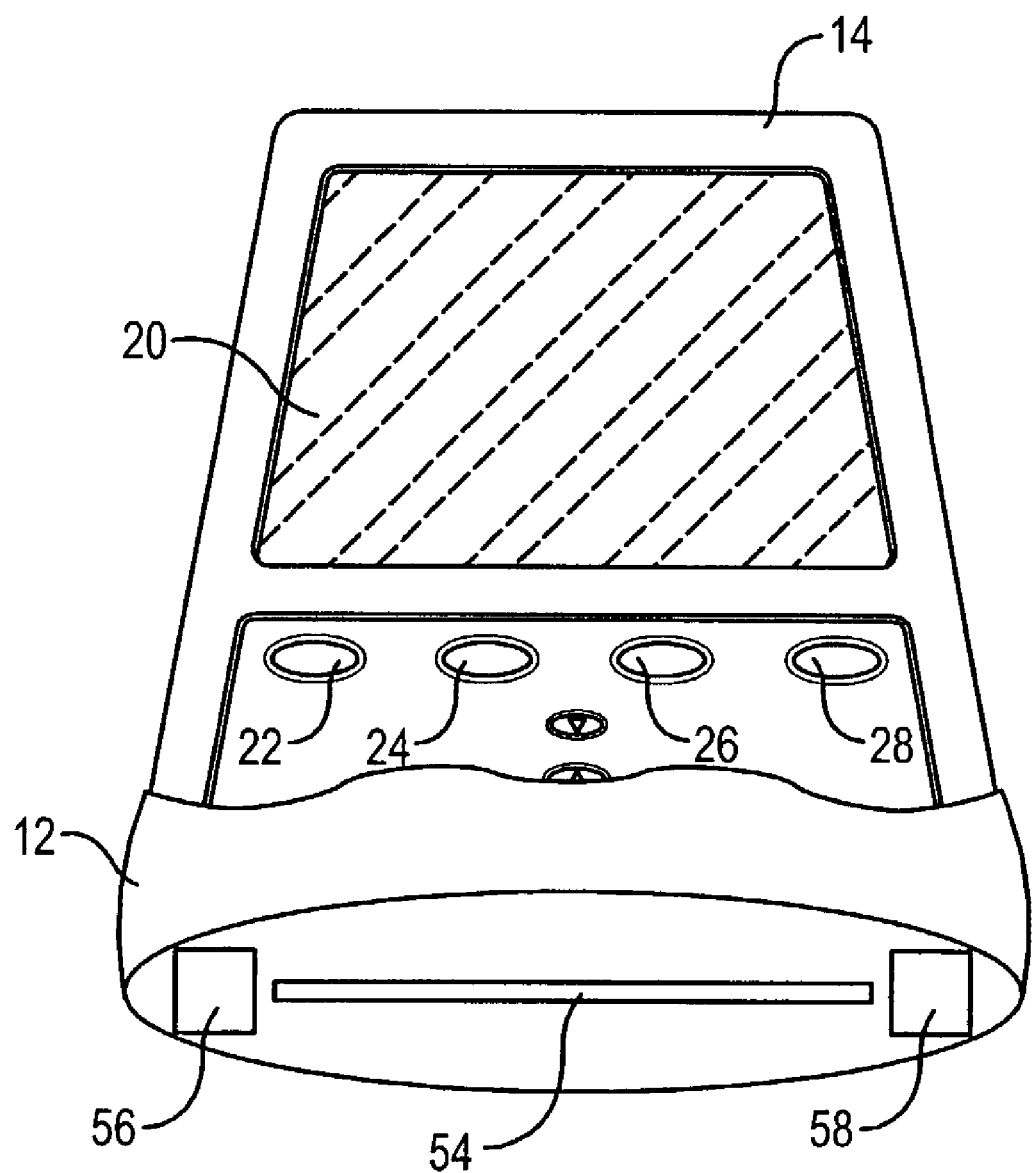
FIG. 4 is a perspective bottom view of a second embodiment of the combination of a wireless handheld communications device and a portable scan device.
Figure 5:
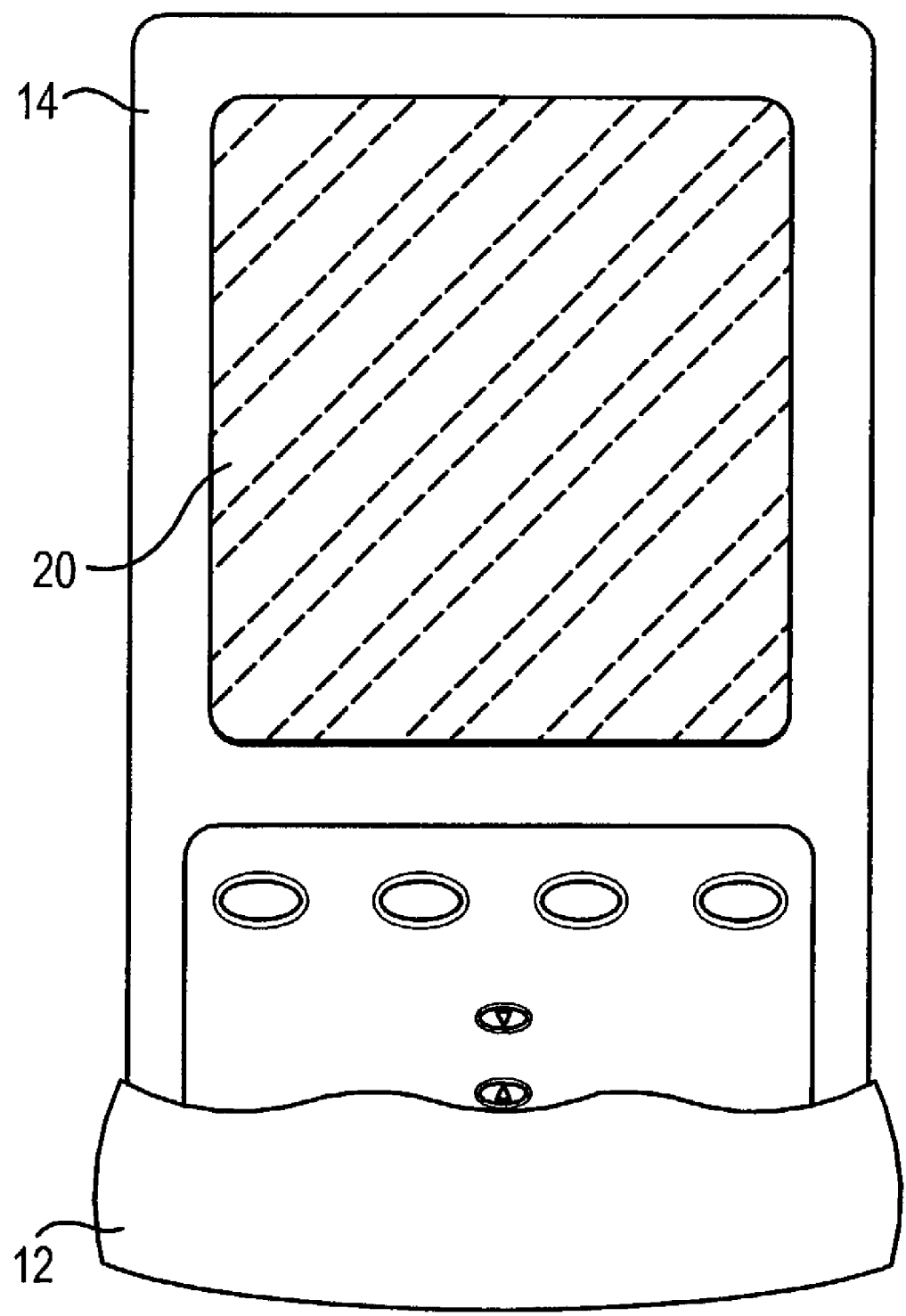
FIG. 5 is a perspective elevated view of the embodiment of FIG. 4.

Another embodiment of the invention is shown in FIGS. 4 and 5. In this embodiment, the wireless handheld communications device 14 plugs into the scan device 12. The scan device includes all of the features of FIG. 2 and is shown in FIG. 4 as having the image sensor 54 and the navigation sensors 56 and 58 at a bottom surface which can be moved along the surface of a document to be scanned. The shape of the scan device of FIGS. 4 and 5 is not critical. The plug-in module may be designed to fit the form-factor of the communications device 14. For example, if the communications device is a PDA, the scan width may be in the order of approximately 7.75 cm.

Figure 6:
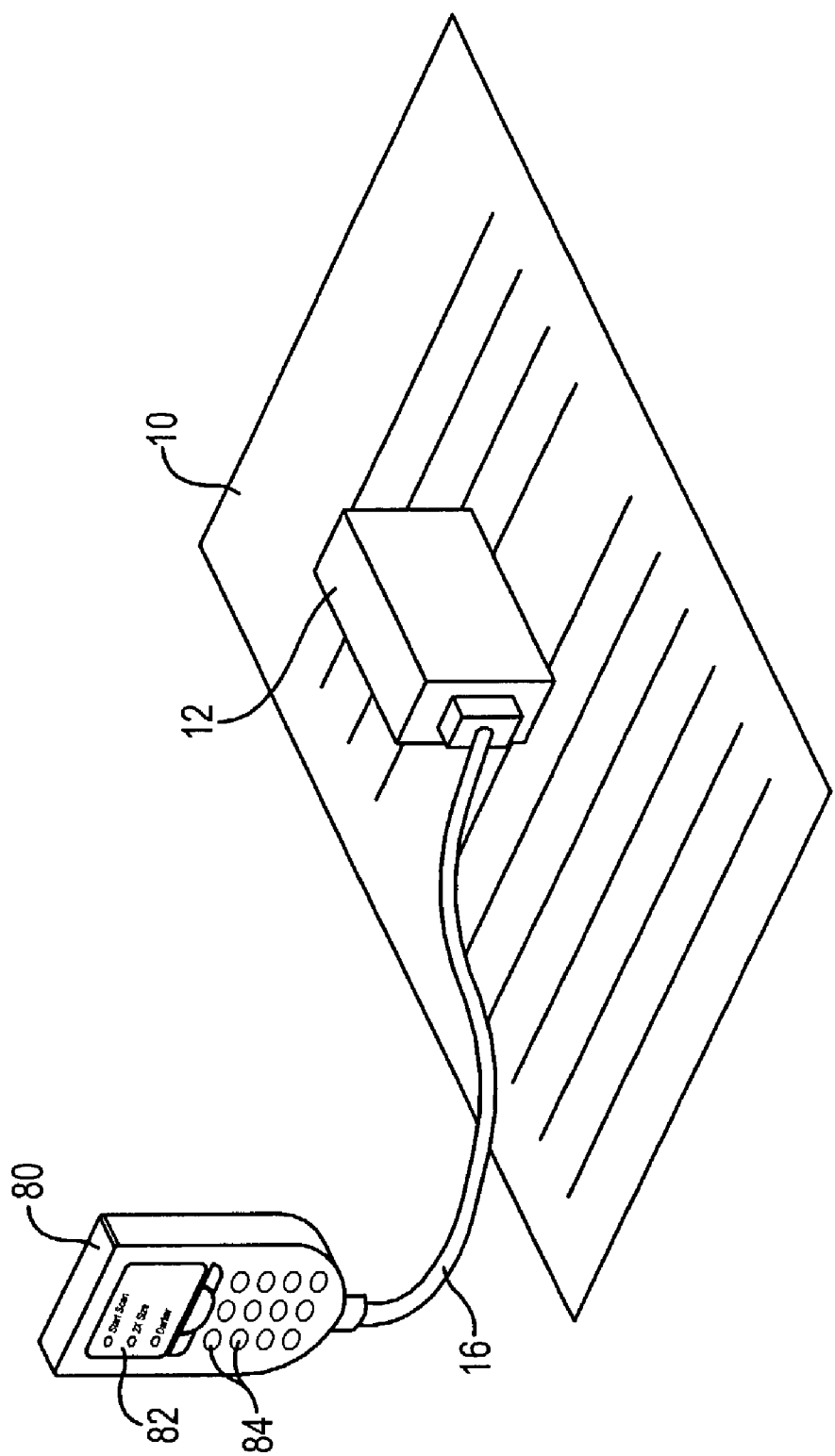
FIG. 6 is a perspective view of another embodiment of the invention, using a cellular telephone as a "host" device, rather than a personal digital assistant.

A third embodiment of the invention is shown in FIG. 6. In this embodiment, the wireless handheld communications device is a cellular telephone 80 having a conventional display 82 and phone keys 84. The scan device 12 is coupled to the cellular telephone by a cable 16. The cellular phone may be programmed to provide the user interface, image display, and document management functions for the scanning operations by the scan device 12. That is, the cellular phone may be used in the same manner as described above with reference to the PDA.

Figure 7:
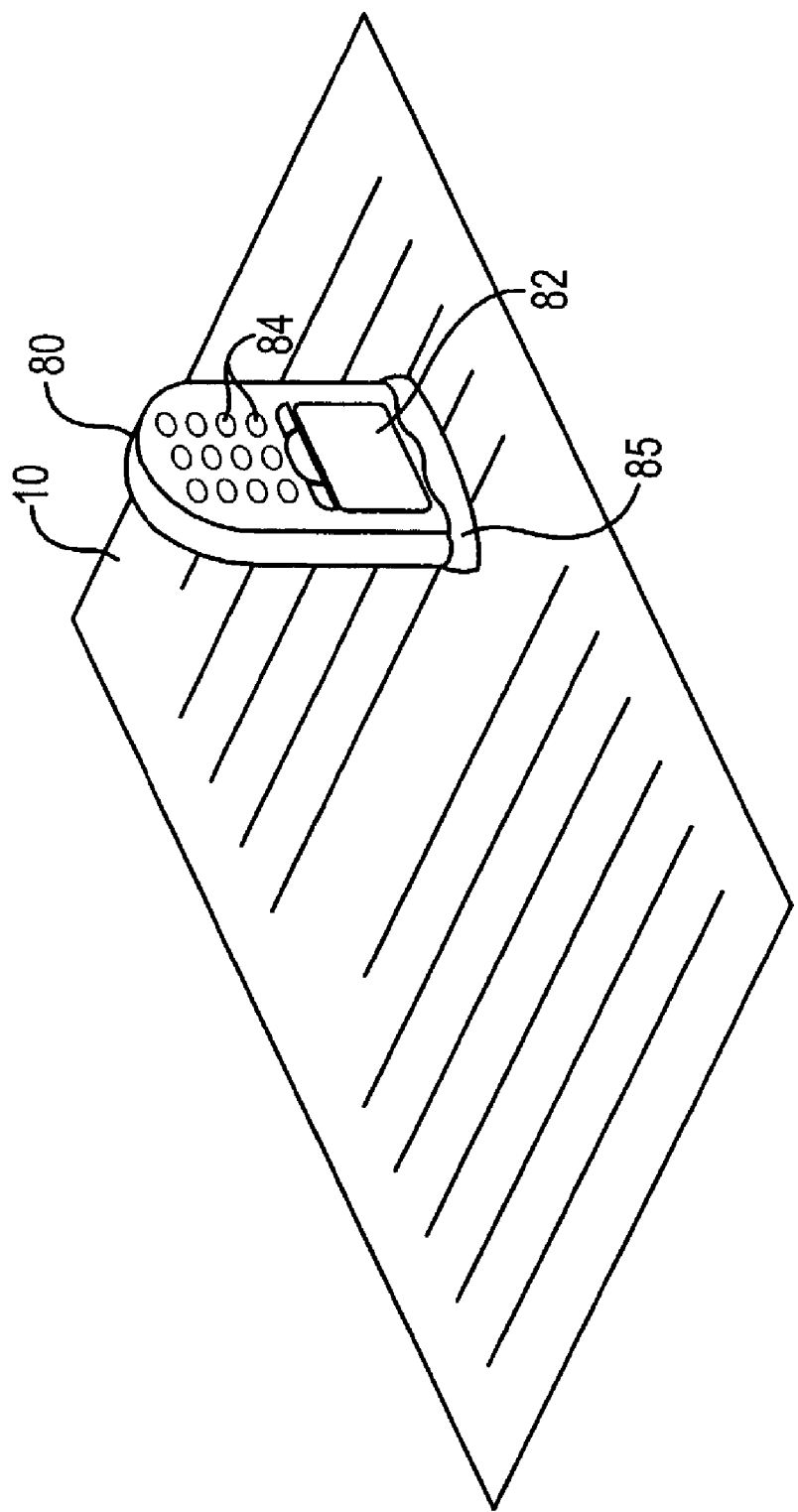
FIG. 7 is an alternative embodiment of a scanner accessory for use with a cellular telephone.

FIG. 7 illustrates an embodiment in which the scanning capability for the cellular telephone 80 is provided by a plug-on module 85. The module is similar to the scan device described with reference to FIGS. 4 and 5. That is, the module 85 includes an image sensor and at least one navigator, so that image information and navigation information are captured as the cellular telephone is moved relative to a document 10. Correlation of the image and navigation information is executed within the cellular telephone, so that a reconstructed image can be presented on the display 82 or transmitted to a remote device, such as a personal computer that receives the reconstructed image via a network connection.

Figure 8:
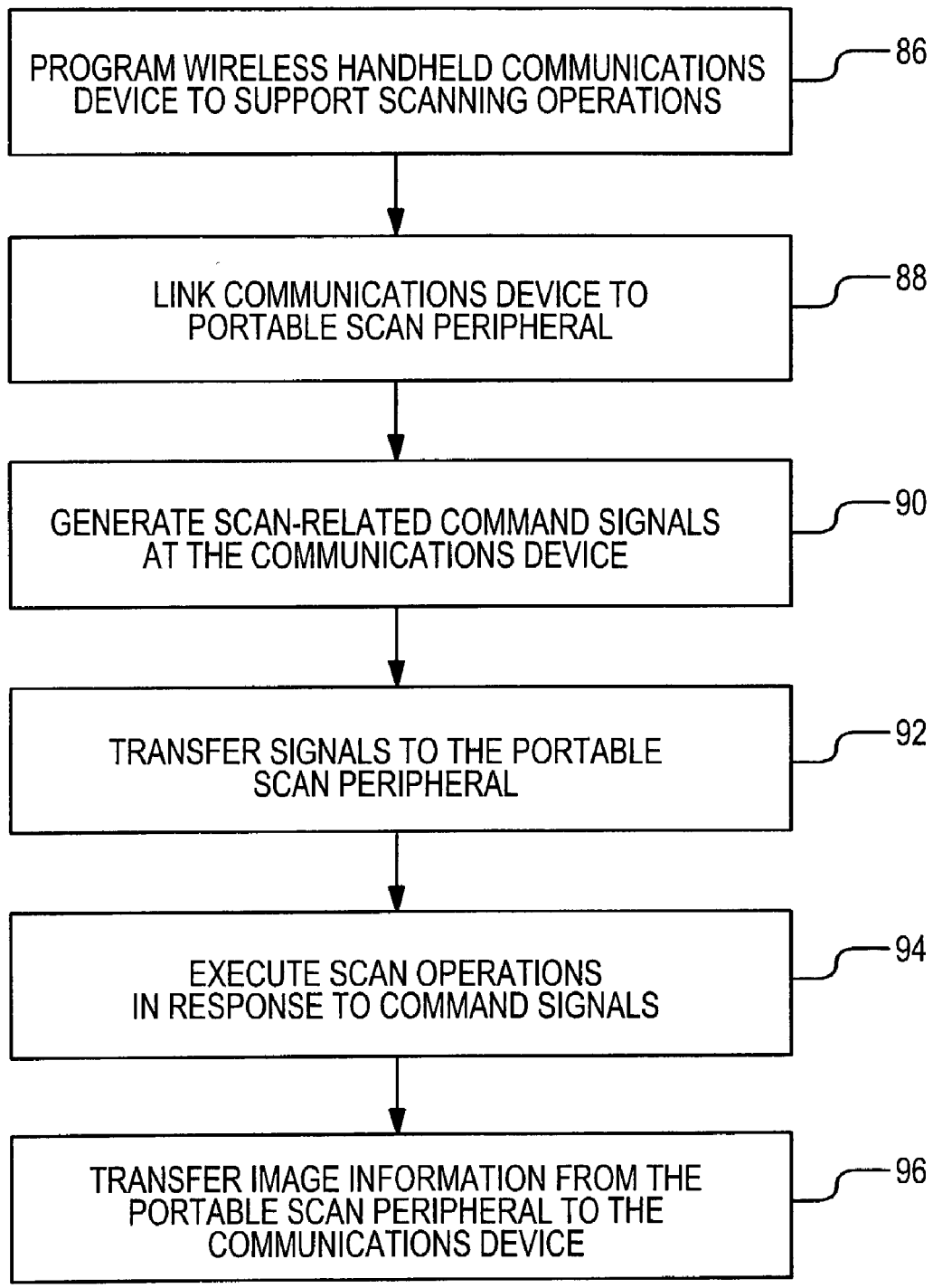
FIG. 8 is a process flow of steps for operating the scanning systems described with reference to FIGS. 1–7.

FIG. 8 illustrates a process flow of steps for cooperation between the wireless handheld communications device and the supported portable scan peripheral device. At step 86, the handheld communications device is programmed to support scanning operations by the peripheral device. The driver software will depend upon the extent of the cooperation between the two devices. For applications in which the correlation processing is to occur within the handheld communications device, the programming must enable the position-tagging of the image information generated at the portable scan peripheral. However, position-tagging is more likely to occur at the peripheral device. The programming of the handheld communications device includes providing a user interface capability for the scanning operations.

At step 88, the wireless handheld communications device is linked to the portable scan peripheral. In one embodiment, the two devices are linked wirelessly. For example, IR exchanges or 802.11 exchanges may be used. As an alternative to the wireless approach, a cable may link the two devices, as shown by the cables 16 in FIGS. 1 and 6. As a third alternative, the two devices may be linked by direct connector-to-connector coupling, as in the cradle embodiment of FIGS. 4 and 5.

At the start of a scan operation, scan-related command signals are generated at the wireless handheld communications device. This is represented at step 90 in FIG. 8. The command signals may be generated to indicate user-selected options, such as the desired size of the scanned image or the desired contrast level. The command signals are transferred to the portable scan peripheral at step 92 using the link that was formed at step 88.

Scan operations are executed in response to the command signals transferred from the wireless handheld communications device, as indicated at step 94. The cooperation that is needed between the two devices will depend upon factors that include the processing capability of the portable scan peripheral device.

Finally, at step 96, image information is transferred from the portable scan peripheral device to the wireless handheld communications device. For applications in which the peripheral device is able to provide the correlation processing, the image information may be transferred as viewable image files in a particular format, such as a TIFF file or a PDF file.

Figure 9:
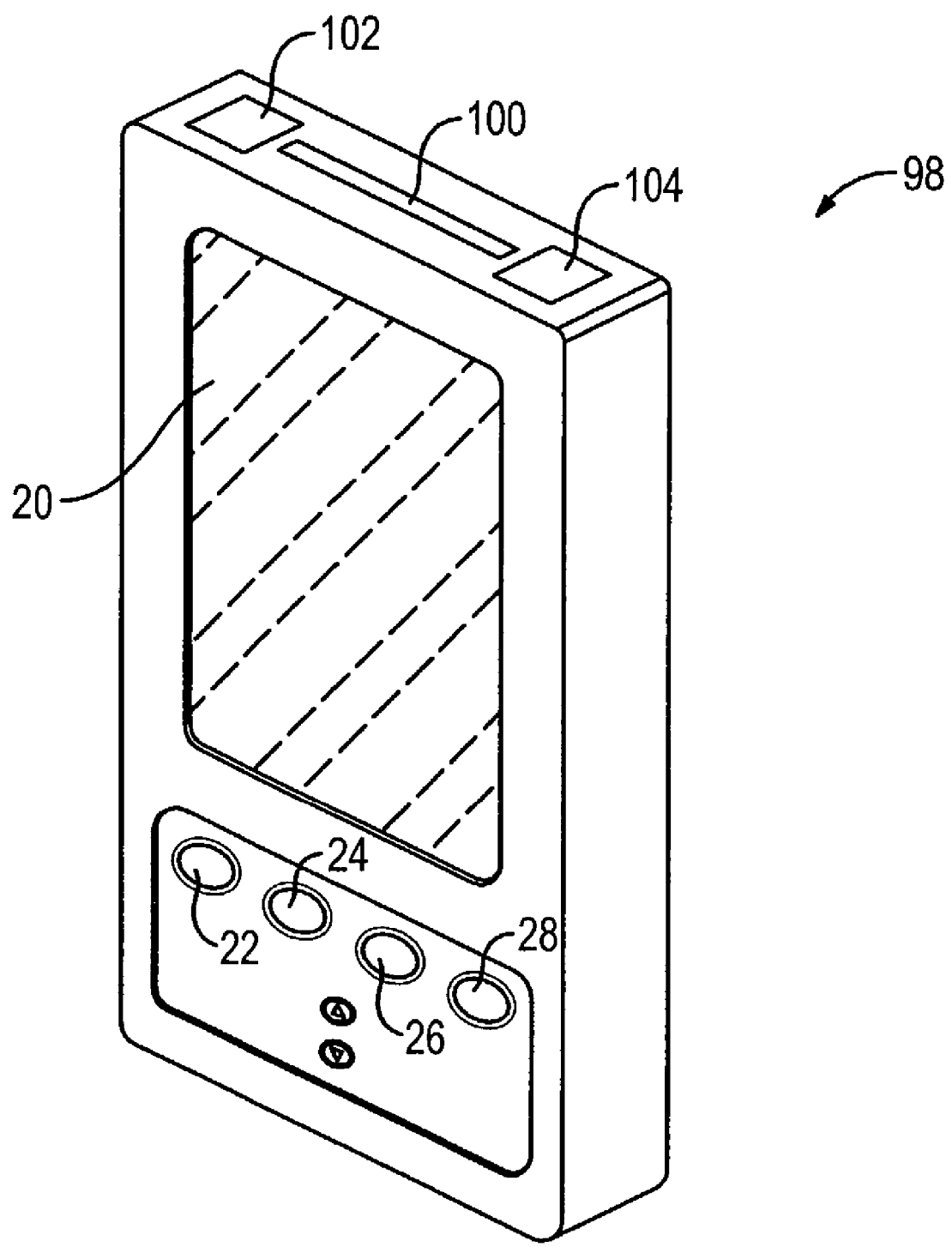
FIG. 9 is a perspective view of a PDA having built-in scanning capability in accordance with another aspect of the invention.

In FIG. 9, the scanning capability has been integrated into a PDA 98. The PDA is a conventional device, but includes scan driver software, an image sensor 100, and a pair of navigation sensors 102 and 104. Scan operations are conducted in the same manner as described above with reference to FIGS. 1–5. Thus, the PDA 98 is placed adjacent to a document and is moved relative to the document. Image information is captured by the image sensor 100. Simultaneously, the navigation sensors 102 and 104 acquire navigation information that is used to "stitch" the image information to reconstruct the image being scanned. The PDA 98 includes a transceiver that enables wireless transmissions to remote devices, such as personal computers connected to a network, such as the global communications network referred to as the Internet.

Figure 10:
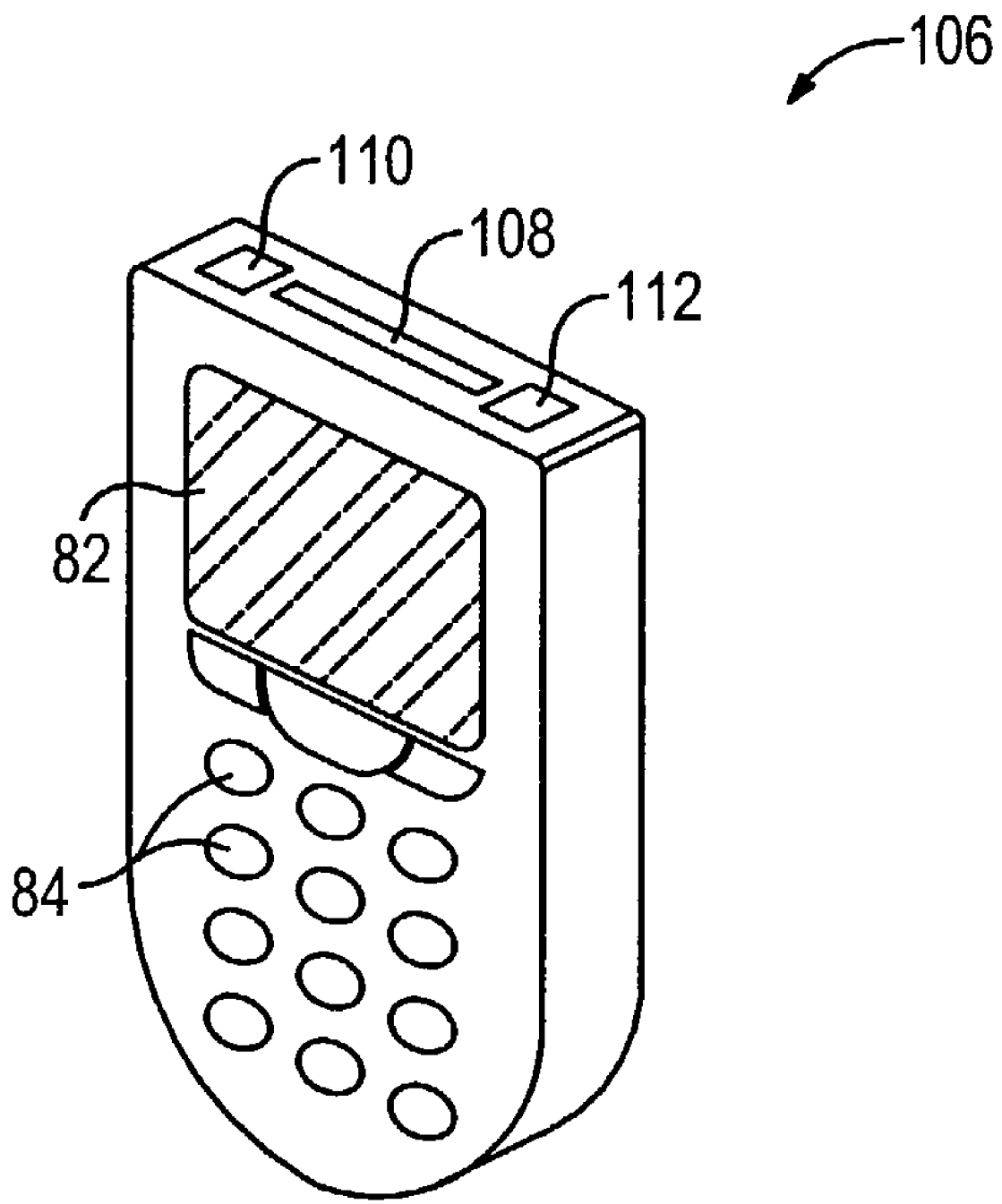
FIG. 10 is a perspective view of a cellular telephone having built-in scanning as in FIG. 9.

A similar approach is shown in FIG. 10, but the scanning capability is integrated into a cellular telephone 106, rather than a PDA. An image sensor 108 and a pair of navigation sensors 110 and 112 are mounted on an exterior surface of the cellular telephone. A protective cover may be used to prevent damage to the sensors when the integrated scanning capability is not in use. Scanning operations are identical to those described with reference to FIG. 9. Reconstructed images may be displayed on the display 82 or may be transmitted via a telecommunications network.

What is claimed is:

1. A scanner accessory which is operationally supported by selectively linking said scanner accessory to a wireless handheld communications device having a user interface and having scan control programming, said scanner accessory comprising:

an image sensor enabled to capture image information that is specific to a surface of interest;

a navigator enabled to generate navigation information that is dependent upon positions of said image sensor relative to said surface of interest; and data transfer circuitry compatible with exchanging information with said wireless handheld communications device, including outgoing captured image information for display and including incoming scan control information that is specific to controlling scanning operations, said scanner accessory thereby being responsive to said wireless handheld communications device with respect to scan control commands and with respect to data specific to controlling scanning operations.

2. The scanner accessory of claim 1 further comprising a housing said image sensor and navigator being connected to said housing, said housing being separate from a display capability such that said image sensor is dependent upon a display of said wireless handheld communications device for presenting said captured image information.

3. The scanner accessory of claim 1 wherein said image sensor includes a linear array of optoeleotronic elements and wherein said navigator includes at least one two-dimensional array of optoelectronic elements.

4. The scanner accessory of claim 3 wherein said navigator has an optical resolution to image structural features of a document having said surface of interest, thereby enabling images of said structural features to be used as said navigational information.

5. The scanner accessory of claim 1 further comprising an image processor connected to said image sensor and said navigator to receive said image information and said navigation information, said image processor being configured to correlate said image and navigation information to generate a reconstructed digital image from said image information.

6. The scanner accessory of claim 5 wherein said image processor has inputs from said image sensor and said navigator, said image processor having an output connected to said data transfer circuitry.

7. The scanner accessory of claim 5 wherein said image processor is responsive to commands received from said wireless handheld communications device via said data transfer circuitry, said commands including a start-scan command.

8. The scanner accessory of claim 6 wherein said image processor is configured to generate an image file that is representative of an image of said surface of interest.

9. The scanner accessory of claim 1 wherein said data transfer circuitry is configured to communicate with a personal digital assistant (PDA).

10. The scanner accessory of claim 1 wherein said data transfer circuitry is configured to communicate with a cellular telephone.

* * * * *